United States Patent [19]
Holzer

[11] Patent Number: 5,267,794
[45] Date of Patent: * Dec. 7, 1993

[54] PROCESS FOR THE PRODUCTION OF AN INDICATOR FOR MONITORING THE TEMPERATURE OF A COOLED OR DEEP-FROZEN PRODUCT, AND A METHOD FOR USING THE INDICATOR

[76] Inventor: Walter Holzer, Drosteweg 19, Meersburg, Fed. Rep. of Germany, 7758

[*] Notice: The portion of the term of this patent subsequent to Dec. 7, 2006 has been disclaimed.

[21] Appl. No.: 82,161
[22] Filed: Aug. 6, 1987
[30] Foreign Application Priority Data Feb. 13, 1987 [DE] Fed. Rep. of Germany ....... 3704616
Apr. 14, 1987 [DE] Fed. Rep. of Germany ....... 3712462

[51] Int. Cl.$^5$ ............................................. G01K 11/06
[52] U.S. Cl. .................................. 374/160; 426/88; 116/207
[58] Field of Search ............... 374/159, 160, 161, 162; 426/88; 116/207, 216

[56] References Cited

U.S. PATENT DOCUMENTS

| | | | |
|---|---|---|---|
| 1,917,048 | 7/1933 | Midgly, Jr. .................. | 116/207 |
| 4,028,944 | 6/1977 | Erb .............................. | 374/160 |
| 4,382,700 | 5/1983 | Youngren ..................... | 374/161 X |
| 4,601,588 | 7/1986 | Takahara et al. ............. | 374/162 X |
| 4,643,588 | 2/1987 | Postle et al. ................. | 374/162 X |
| 4,735,745 | 4/1988 | Preziosi et al. .............. | 374/162 X |
| 4,765,243 | 10/1973 | Pickett et al. ................ | 374/160 |

FOREIGN PATENT DOCUMENTS 3914599 11/1990 Fed. Rep. of Germany ....... 374/160
18966 5/1986 Japan- .................................. 374/160

Primary Examiner—William A. Cuchlinski, Jr.
Assistant Examiner—G. Bradley Bennett
Attorney, Agent, or Firm—Robbins, Berliner & Carson

[57] ABSTRACT

A process for the production of an indicator for monitoring the temperature of a cooled or deep-frozen product, such as packaged foodstuffs, pharmaceuticals and the like, is provided, which indicator shows that a predetermined critical temperature of the cooled or deep-frozen product has been exceeded. An easily applicable and economically made indicator is produced by casting a substance which is fluid or semifluid above the critical temperature into a specific geometrical shape and then cooling the substance below the critical temperature until it assumes a solid form. The critical temperature may in this connection lie above or below 0 degrees Centigrade. The change of the aggregate state of the fluid substance should to this end occur close to the critical temperature of the cooled or deep-frozen product, so that upon exceeding the critical temperature of the cooled or deep-frozen product to the point of thawing, the frozen indicator irreversibly loses its specific geometrical shape and thereby indicates thawing of the cooled or deep-frozen product in a fail-safe manner.

9 Claims, 3 Drawing Sheets

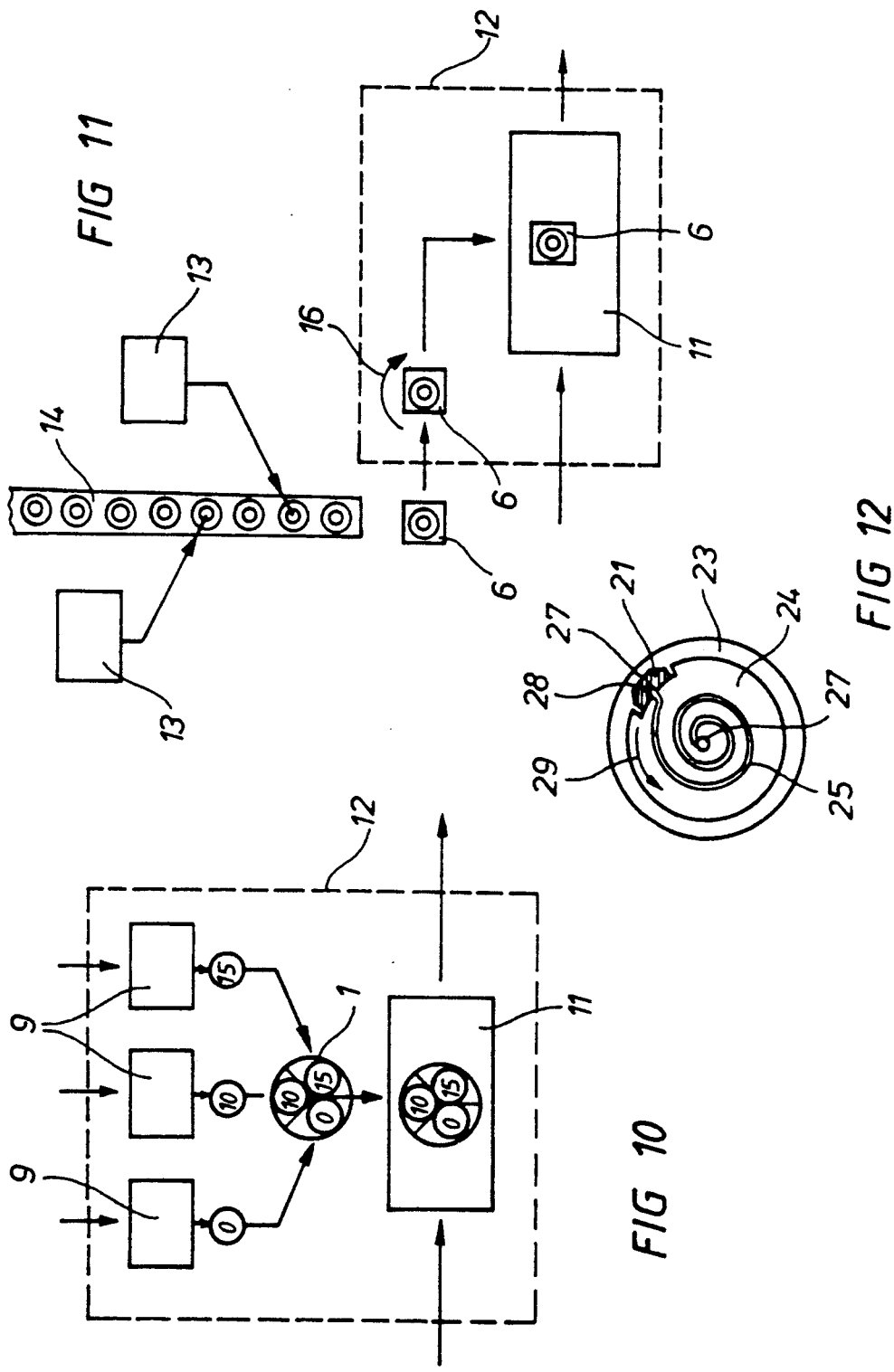

PROCESS FOR THE PRODUCTION OF AN INDICATOR FOR MONITORING THE TEMPERATURE OF A COOLED OR DEEP-FROZEN PRODUCT, AND A METHOD FOR USING THE INDICATOR

BACKGROUND OF THE INVENTION

This invention relates to a process for the production of an indicator for monitoring the temperature of a cooled or deep-frozen product, such as packaged foodstuffs, pharmaceuticals and the like, the indicator indicating that a critial temperature of the cooled or deep-frozen product has been exceeded, as well as a novel method of using the indicator in accordance with the invention. To this end, "cooled products" are products which should be cooled to a temperature exceeding 0° Centigrade, whereas "deep-frozen foodstuffs" are constantly and uninterruptedly kept below a critical temperature of about −17° C.

Even a brief heating and a repeated cooling or freezing may lead to serious deleterious changes to the foodstuffs, which frequently cause serious damage to health. This applies similarly to pharmaceuticals, preserved blood and other products.

A strict monitoring of the "cooling chain" is necessary, primarily in the case of industrial cooling or freezing until the defrosting operation prior to consumption of the foodstuffs occurs.

Unfortunately, however, technical breakdowns, and also human failure, can never be wholly prevented. An object of the invention is to specify a process which permits uninterrupted verification that the specified critical temperatures has actually never been exceeded.

Until now, a monitoring operation on such cooled or deep-frozen products was possible only with difficulty. Thermometers utilising following pointers were commonly utilised for this purpose, wherein it was then possible to detect that the critical temperature had been exceeded to the point of thawing of the cooled or deep-frozen product, based on the position of the trailing pointer. On the one hand, thermometers of this kind are comparatively costly, and on the other hand, are easily manipulated.

SUMMARY OF THE INVENTION

Consequently an object of the invention is to develop a process of the kind defined in the foregoing, in such manner that it is possible at little cost and in uncomplicated manner to perform a monitoring operation showing whether a critical temperature of a cooled or deep-frozen product had been exceeded.

To resolve the problem posed, the invention is characterised by a process for the production of an indicator which is cast into a geometrical shape in the fluid or semifluid state above the critical temperature, and which indicator substance is then cooled until it assumes a solid form.

The process proposed according to the invention comprises freezing a temperature indicator, for example a fluid, in a specific shape, and when the melting point is reached, the said shape is destroyed irreversibly by the melting operation.

Consequently, the essence of the present invention consists in that the change of the aggregate state is utilised to indicate that the critical temperature which is to be monitored has been exceeded to the point of thawing the cooled or deep-frozen product. The indicator is preferably fluid (meaning hereinafter fluid or semifluid) above the required critical temperature. In this state, the indicator is molded into a specific geometrical shape, e.g. by placing this fluid or semifluid substance in a casting mold, which defines a spheroid, tablet or other geometrical shape. The indicator substance is then frozen in this shape, its material composition being so selected that it changes its aggregate state close to the critical temperature and changes from the fluid or semifluid form into a solid specific shape. After this substance has dropped below its freezing point, it consequently solidifies in the mold and may be easily stripped from the mold, the indicator thereby being available as a frozen substance in the said specific geometrical shape. It is then added either in its existing state to the cooled or deep-frozen product within the package, or it is placed in an indicator unit, which in the simplest case is a container which is transparent at least on one side, so that possible melting of this indicator substance may easily be observed once the cooled or deep-frozen product itself unduly exceeds a critical temperature to the point of thawing.

As the critical temperature is exceeded, the indicator itself thus equally thaws out and irreversibly loses its specific geometrical shape. What is of importance in this connection is that the container (indicator unit) should also permit an irreversible change in the shape of the indicator substance.

Economical and easily applicable indicators may thus be produced by means of this inventive process, whereby an interruption in the cooling chain may easily be detected in the case of cooled or deep-frozen products.

For this purpose, it is preferable for the indicator substance to be a fluid or a gel while implementing the production process.

Alcohol-water mixtures or alcohol-water-glycol mixtures are particularly preferred as possible fluids.

The scope of the present invention to this end covers all the substances which change their aggregate state at the critical temperature of the deep-frozen product which is to be monitored. It is thus possible to make use of substances having a critical temperature below 0° Centigrade. Deep-frozen products are consequently monitored with these substances. It is however possible in precisely the same way to monitor only cooled products above 0° Centigrade.

There are substances for this purpose (e.g. a mixture of 80% of water and formic or acetic acid) which freeze at a temperature exceeding 0° Centigrade, e.g. at a temperature of +8° Centigrade. Substances of this kind are then utilised for monitoring the critical temperature of a cooled or chilled product, the critical temperature of which lies at +8° C., for example.

If the monitoring operation is to be made more positive, several indicators having different melting points are provided, and it is recommended that the temperatures be specified by legends and/or coloration e.g. in the green, yellow and red colors. To this end, as in traffic sign, the colors could denote:

"green"=no danger,
"yellow"=attention, care is required, and
"red"=danger.

Combinations of the indicator symbols are also recommended, e.g. "green" with the marking "15", "yellow" with the marking "10" and "red" with the marking "0", the numerals also being used to provide a direct indication of the approximate melting point.

According to the process, the indicators, for example being in the form of small spheroids or tablets, are initially frozen and are subsequently sorted out, either singly or in the groups corresponding to the characteristic temperatures, for inclusion in thermally conductive manner as a packaged unit, with the cooled or deep-frozen product which is to be monitored. This procedure however requires that the indicators should either be produced together with the products which are to be chilled or intensively cooled, in refrigerating rooms, or should equally be included in a "cooling chain".

An improved process for the production of indicators is proposed for this reason, which process consists of utilising a centrally symmetrical hollow mold as a specific geometrical shape, e.g. in the form of a circular ring or of circular ring segments, and these are partially filled with indicator fluid. This mold may be conveyed and stored in the warm state, without any worry. It is only prior to being packaged or wrapped together with the products which are to be monitored that the fluid is frozen in the hollow mold under rotation coincident about the center of the mold. To this end, care should be exercised to assure that the rotational speed is sufficiently great to displace the fluid into the outer marginal areas by the centrifugal force generated. The fluid will thereby take the shape of a circular ring or the shape of several circular ring sections, in the frozen state.

If several checking temperatures are desirable, several hollow molds are proposed, in the form of a central circle comprising one or more rings or segments which may be commonly centrifuged and frozen.

According to this process, even a housewife is able to implement a perfect monitoring operation on the cooling conditions for the foods frozen by herself. All that is needed is a small motor-driven centrifuge, which is placed in the deep freezer, together with the as yet unfrozen indicators, until these are frozen and can be installed on the chilled foodstuffs in thermally conductive manner.

For a simplified application, it is recommended according to the invention to provide a pack for the indicators which on the one hand prevents any impairment to the foodstuffs, and on the other hand permits easy monitoring, e.g. by means of transparency.

The object of the present invention is disclosed not only by the object of the individual claims but also by the combination of the individual claims with one another. All the data and features disclosed in the documents inclusive of the abstract and in particular the embodiment illustrated in the drawings, are claimed as being essential to the invention, inasmuch as they are novel singly or in combination compared to the prior art.

The invention is described in particular in the following with reference to the drawings illustrating several modes of embodiment.

To this end, other features and advantages of the invention are apparent from the drawings and their description.

BRIEF DESCRIPTION OF THE DRAWINGS

FIG. 12 shows a fourth example of an indicator unit in plan view.

DETAILED DESCRIPTION OF THE PREFERRED EMBODIMENTS

Figure 1:
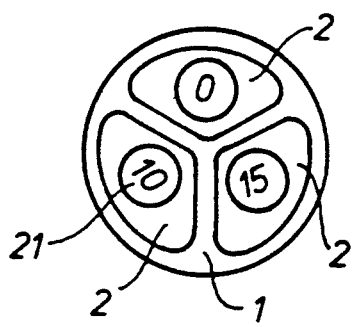
FIG. 1 is a plan view of an indicator unit in its operative condition below a temperature of −15° C., for example.
Figure 2:
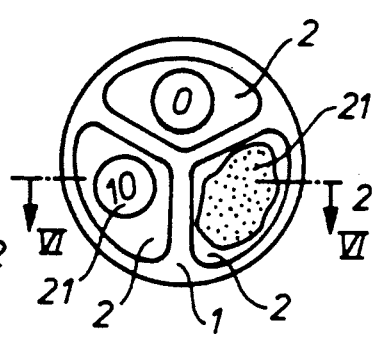
FIG. 2 shows the same indicator unit as FIG. 1 within a temperature range of between −15° C. and −10° C., for example.
Figure 3:
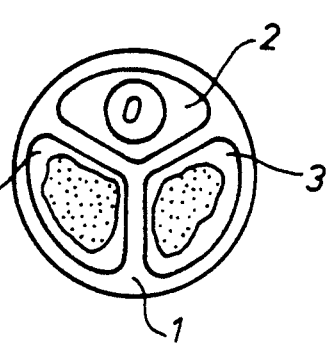
FIG. 3 shows the same indicator unit as before, within the temperature range below 0° C.

FIGS. 1, 2 and 3 serve the purpose of explaining the process. FIG. 1 illustrates a round indicator unit 1, e.g. formed by interwelded foils of transparent plastics material, wherein three indicators 21 "0", "10" and "15" were placed in cavities 2 in the frozen state. The legends of the indicators could correspond to the melting points in question, for example. It is equally recommended that the indicators be dyed in different colours for the different temperatures.

The indicator unit 1 is illustrated in FIG. 1 and has a melting point of minus 15° C. If the temperature rises above −15° C., the state shown in FIG. 2 is initially reached, i.e. the indicators "0" and "10" are still unchanged, whereas the indicator "15" has melted and lost its tablet shaped form.

As the temperature rises above −10° C., the state shown in FIG. 3 is attained, so that only the indicator "0" is unchanged, while both indicators "10" and "15" are melted. During further heating above 0° C., the indicator "0" finally also melts and the temperature limit exceeded in each case may be correctly detected.

Figure 4:
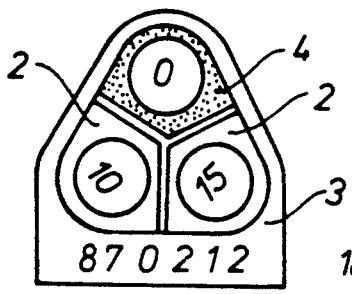
FIG. 4 shows another form of embodiment of an indicator unit.

Another embodiment is illustrated in FIG. 4. A space is provided in this case on the indicator unit 3 for a legend, e.g. "870212" as a supplemental coding. The indicators "10" and "15" are again installed in the cavities 2, whereas the indicator in the third cavity, being the indicator "0", is surrounded by a composition 4 which has the property of expanding considerably upon being wetted with fluid. FIG. 4 firstly illustrates the indicator unit 3 in the frozen state below −15° C. All three indicators "0", "10" and "15" have their specific tablet shape.

Figure 5:
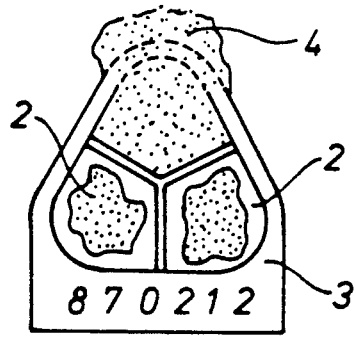
FIG. 5 shows the indicator unit as in FIG. 4 after the critical temperature range has been exceeded.

By contrast, FIG. 5 shows the same indicator unit after the temperature "0" is exceeded. All three indicators have melted, but the greatly expanded composition 4 has burst the indicator unit and emerged into the package, thereby colouring the foodstuffs for example and thereby indicating the same as being inedible. In the case of the exemplifying round indicator unit 1 or in that of the example of the indicator unit 3, separating ribs 5 are provided which prevent mixing of the molten fluids and permit clearer detection of the condition.

Figure 6:
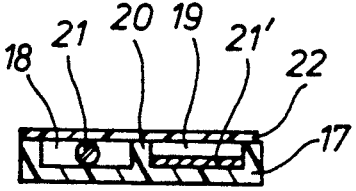
FIG. 6 shows a section through the indicator unit shown in FIG. 2 in the direction of the arrow VI—VI.

FIG. 6 is a schematic illustration of a possible form of embodiment of an indicator unit 1 according to FIGS. 1 to 3.

The cavities 2 depicted in FIGS. 1-5 are situated in an upwardly open container 17, which is produced as a plastics material injection molding, as an expanded component or stamped out of a sheet. Each cavity is defined by the encircling rim 15 of the container 17 in conjunction with one or more separating ribs 5.

To this end, each cavity 2 has contained in it an indicator 21 which in the embodiment in FIGS. 2 and 6 is not yet molten in the left-hand side cavity, whereas the indicator 21' in the right-hand side cavity has melted, for example because the indicator unit 1 had been exposed to a temperature above $-15°$ C. and below $-10°$ C.

The indicator 21' has consequently lost its fixed specific geometrical shape and settled on the bottom of the cavity 2.

It is then easily possible to detect via the transparent foil 22 covering the container 17 at the top, that the indicator unit 1 had been exposed to a temperature above $-15°$ C.

Figure 7:
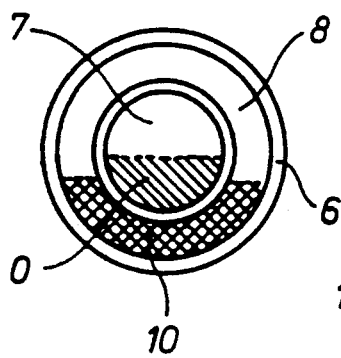
FIG. 7 shows a plan view of a third form of embodiment of an indicator unit in the molten state.
Figure 8:
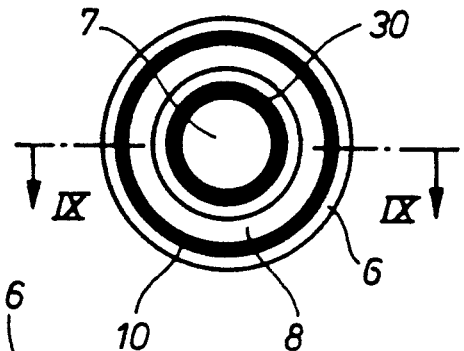
FIG. 8 shows the same indicator unit as in FIG. 7 in the operative condition.

FIGS. 7 and 8 illustrate another centrally symmetrical embodiment of an indicator unit 6, the indicators being produced in a specific form according to an inventive method.

FIG. 7 firstly shows such an indicator unit 6 which has a circular cavity 7 at its center and an annular cavity 8 concentrically arranged with respect to the former. For example, a fluid 30 having a melting point at $0°$ C. is placed in the cavity 7, and a fluid 10 having a melting point of $-10°$ C. is placed in the annular chamber 8. It is essential for the two cavities to be only filled partially, so that the state shown in FIG. 8 is reached under rapid rotation, i.e. centrifuging of the indicator unit 6. The fluid 30 will accumulate on the outer surface of the circular cavity 7, and the fluid 10 will accumulate on the outer rim of the annular chamber 8. The indicator unit 6 may then be cooled intensively under continuing rotation, so that the fluids 10,30 appear as ice rings after freezing.

In this embodiment too, it is possible to monitor several temperatures by means of other concentric annular cavities.

FIG. 9 again shows a possible example of embodiment of the structure of the indicator unit 6, the cavities 7,8 being separated by an annular partition 20 within a transparent container. In this example of embodiment, it is also of importance that the volume of the annular cavities 7,8 should be substantially greater than the volume of the fluids 10,30 deposited in these cavities, so that a distribution of large area of the fluids 10,30 may be observed in the cavities 7,8 in question, and that an easy verification is assured, regarding whether a critical temperature has been exceeded.

The process sequences according to the invention are illustrated in FIGS. 10 and 11.

The process consists in that the indicators having the different melting or rather freezing points are initially produced—i.e. frozen—in freezing chambers 9 in a specific shape, e.g. as spheroids or flat tablets. They are then placed in the indicator unit 1 and finally packaged with the deep-frozen product 11 in thermally conductive manner. For example, this may be performed by bonding or welding on in a common wrapper. In this process, it is necessary that all the production operations for the indicator unit 1 or rather of the indicators "0", "10" and "15" should be performed within the cold area 12 to prevent premature melting of the indicators.

This condition may easily be fulfilled in the case of industrial large-scale production, since deep-freezing operations also occur on large premises.

Figure 9:
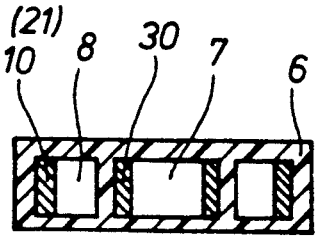
FIG. 9 shows a section along the line IX—IX in FIG. 8, FIG. 10 schematically shows the process steps for the production of an indicator unit as shown in FIGS. 1 to 6, FIG. 11 schematically shows the process steps for the production of an indicator unit as shown in FIGS. 7 to 9.

By contrast thereto, FIG. 11 shows a production method for indicators which is not restricted to these conditions. During the process sequence illustrated schematically the circular and annular cavities 7,8 respectively as illustrated in FIGS. 7-9 are charged with fluids from metering systems 13. The transparent containers of the indicator unit 6 are placed in a row, one behind another, in a strip arrangement. The strip 14 is closed in known manner by means of a cover strip, and cut off.

The indicator unit 6 thus produced at room temperature in uncomplicated manner may be packaged, despatched and stored without special precautions. It is only shortly prior to the application of the indicator unit 6 on the deep-frozen product 11, that the indicator unit 6 is placed in rotational displacement 16 by means of a small battery-driven centrifuge and frozen thereby within the cold area 12, for example in a small domestic freezing compartment.

FIG. 12 shows another indicator unit 23 in which the fluid of the indicator 21 is utilised only for indirect triggering of an indication which shows when the critical temperature range has been exceeded.

To this end, the indicator unit 23 comprises a transparent housing, the cavity 24 of which has a spring 25 in the form of a spiral extending outwards radially from a clamping point 26 and having its free outer spring extremity 28 dipping into a container 27 filled with fluid 21.

To establish the operational condition of this indicator unit 23, the spring is first held fast mechanically by auxiliary means (not shown), particularly, so that the spring extremity is dipped under spring loading into the indicator fluid 21 present in the container 27. The indicator unit is deep-frozen in this position, the indicator 21 thereby solidifying and then automatically retaining the spring extremity.

After a critical temperature has been exceeded in the direction leading to thawing of the indicator 21, the spring extremity 28 flicks away in the direction of the arrow 29 and the fact that the critical temperature range has been exceeded may then be detected from the position of the spring 25.

Indirect indicator devices of this nature in which the indicator 21 merely actuates the indicator device when the melting point of the indicator fluid has been exceeded, are available in various forms of embodiment. It is also possible to make use of an unilaterally clamped straight flexing spring instead of a spirally wound spring 25. Electrical indicator devices and the like are also possible instead of mechanical indicator devices such as described by reference to the spring 25.

The production as well as application of the indicator 6 are not subject to any complex measures. An optional storage at room temperature, trouble-free transport and uncomplicated automatic production—equally at room temperature—characterize this indicator. The trouble-free shaping of the indicator fluid by centrifuging, almost simultaneously with intensive cooling of the foods, also however renders this method tailor-made for small-scale domestic application.

The most varied of substances may be utilised as materials for the indicator fluid, as already described in the foregoing. It is thus possible to utilise fluids or other solutions compatible with the environment, and those that penetrate into the frozen merchandise upon thawing and render this frozen merchandise inedible or unusable.

In a development of the present invention, corresponding to FIGS. 13 to 16, an indicator unit 33 is proposed which by comparison, does not comprise annularly shaped cavities of the embodiment in FIGS. 7 to 9, and which on the contrary has cavities 32 of circular segment shape formed in a carrier 31 consisting of plastics material. A part of this nature may be produced very easily by the deep-drawing method.

The carrier for this purpose comprises a plastics material foil, e.g..a polyethylene or PVC foil, wherein the cavities 32 in the form of circular segments which have been described, are produced by the deep-drawing method. This carrier 31 is covered on its upper side by a transparent foil 22 so that the cavities 32 are closed off completely.

Three cavities 32 of this nature are arranged in peripheral distribution in the carrier 31, in the example of embodiment shown.

Figure 13:
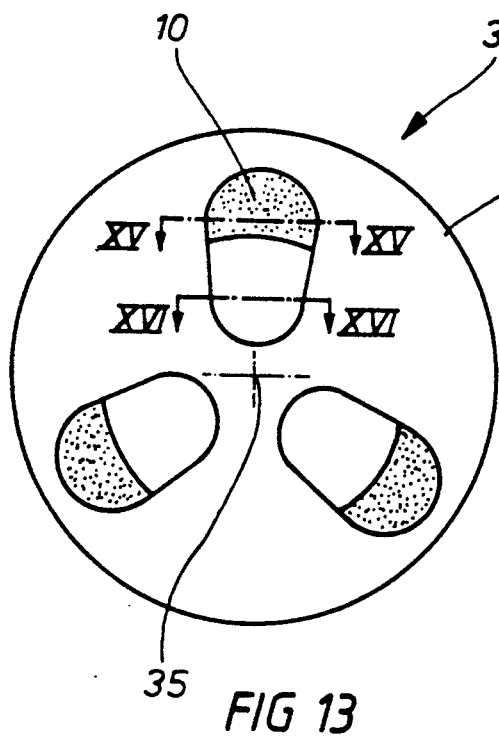
FIG. 13 shows a plan view of a fifth embodiment of an indicator unit in the frozen state.

The said indicator unit 33 is then exposed to the same centrifuging action as that described with reference to the embodiment according to FIGS. 7 to 9, to the effect that the indicator unit 33 is rotated around the axis of rotation 35 under simultaneous cooling action, so that the fluid 10 present in the cavities 32 is displaced radially outwards under the action of centrifugal force. After dropping below its critical temperature, this fluid 10 then acquires its solid state in the cavities 32, as illustrated in FIG. 13.

Let us point out again that the indicator unit 33 disclosed herein, and the other indicator units 3, 6, 23 as well, may be utilised to monitor cooled products as well as intensively cooled products.

Figure 14:
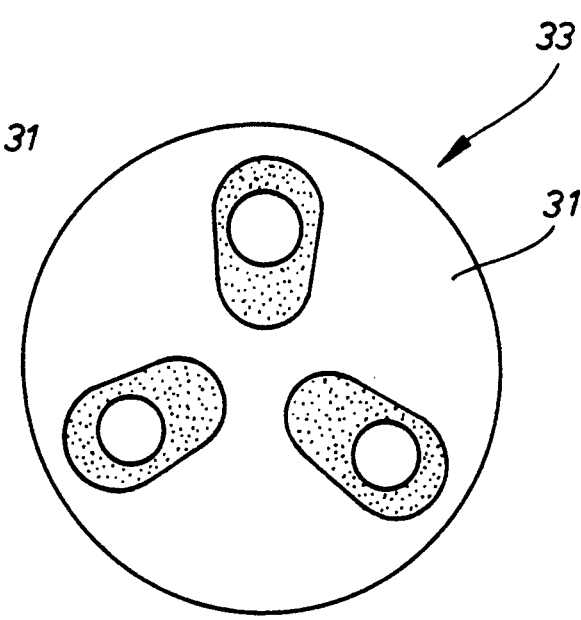
FIG. 14 shows a plan view corresponding to FIG. 13 in the molten state.
Figure 15:
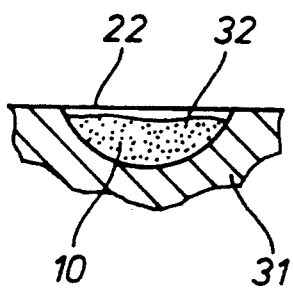
FIG. 15 shows a section along the line XV—XV in FIG. 13.
Figure 16:
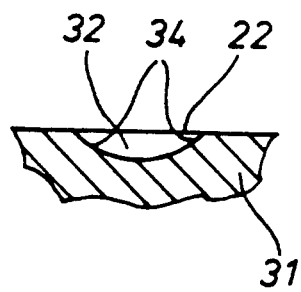
FIG. 16 shows a section along the line XVI—XVI in FIG. 13.

If the indicator unit 33 is then exposed to a temperature such that the fluid 10 changes its aggregate state in the cavities 32, the fluid is then distributed throughout the cavity with circular areas being left according to FIG. 14.

It is important in this connection that the bottom of the cavities 32 should rise towards the axis of rotation 35 in radial direction, i.e. being produced in conical form. The fluid. 10 is consequently distributed not only by the action of gravity whilst melting, because a distribution of the fluid under the action of gravity could be impaired by a disadvantageous location of the indicator unit.

On the contrary, the fluid 10 is distributed by capillary action, i.e. it creeps into all points of the cavity 32 by capillary effect, i.e. also against the centrifugal force, thereby assuring a particularly uniform distribution of the fluid throughout the cavity 32 irrespective of the position in which the indicator unit is then exposed to a heating action.

Such a distribution under capillary action has the supplemental advantage that it prevents possible fraudulent intentions, because a renewed centrifuging operation on the indicator unit once it had thawed is then no longer possible because traces of the fluid are then always visible in the capillary spaces of the cavity 32.

In this connection, it is of importance that the edges 34 of the base area of the cavity 32 should extend almost tangentially or at least at an acute angle to the foil 22, so that the required capillary spaces may be formed thereby.

In the preceding description, it was repeatedly explained that the indicator should assume a "fixed" shape upon freezing. This concept of a fixed shape should however be interpreted as a relative term only within the ambit of the inventive principle specified, since for example particular aqueous solutions merely freeze into "semisolid", i.e. gelatinous structures.

Moreover, the critical temperature need not be specified as a precise point, since particular mixtures of substances freeze within the range of a particular "band width" and the melting of a mixture of substances of this kind may occur throughout a particular temperature range.

The indicator 21 is provided moreover as a single substance or as a mixture of substances in a cavity of the indicator unit respectively. In a development, the indicator may however comprise a plurality of small identical (frozen) spheroids which are placed together in a cavity. The forming of the indicator from a plurality of small individual spheroids or other individual elements may be selected for reasons connected with production or else on the grounds of improved visibility.

Instead of constructing the plate-like carrier with hollow annular circles, circular segments or other hollow shapes, it is possible to utilise any other arbitrary hollow shape. Forming the hollow shapes into spheroidal caps proved to be particularly advantageous because their production is particularly uncomplicated.

The schematically illustrated examples should merely be interpreted as such, since numerous other specific forms, which are lost irreversibly after melting are also possible. Further references in this connection are apparent from the drawings.

What we claim is:

1. In a process for the production of an indicator for monitoring the temperature of a cooled or deep-frozen product, such as packaged foodstuffs, pharmaceuticals and the like, the indicator denoting that a critical temperature of the cooled or deep-frozen product has been exceeded, the improving comprising:
   (a) providing a hollow mold having a fixed geometrical shape including an outer circular area;
   (b) arranging said mold concentrically with respect to an axis of rotation;
   (c) partially filling said hollow mold with a substance which is fluid above said critical temperature;
   (d) applying centrifugal action to said hollow mold until said fluid substance is situated in the outer circular area of said hollow mold; and
   (e) cooling said rotating hollow mold during the centrifuging operation until the fluid substance present in the outer circular area of said hollow mold solidifies.

2. The process as claimed in claim 1, whereby the substance of the indicator is a mixture of aqueous solutions.

3. The process as claimed in claim 1, wherein a casting mold, which imparts a spheroidal, tablet-like form to the substance in the frozen state, is selected as the fixed geometrical shape into which the fluid substance is cast.

4. The process as claimed in claim 1, wherein a composition, which expands considerably by liquid absorption occurring during thawing, is added to the substance.

5. The process as claimed in claim 1, wherein the hollow mold has capillary interstices.

6. The process as claimed in claim 5, wherein the cross-section of the hollow mold narrows in the direction towards the axis of rotation.

7. A method of monitoring the temperature of at least one cooled or deep-frozen product which comprises the steps of:
(a) providing several indicators for monitoring temperature, each said indicator being adapted to define when a critical temperature has been exceeded;
(b) producing each said indicator by:
 (i) providing a hollow mold having a fixed geometrical shape including an outer circular area;
 (ii) arranging said mold concentrically with respect to an axis of rotation;
 (iii) partially filling said hollow mold with a substance which is fluid above said critical temperature;
 (iv) applying centrifugal action to said hollow mold until said fluid substance is situated in the outer circular area of said hollow mold; and
 (v) cooling said rotating hollow mold during the centrifuging operation until the fluid substance present in the outer circular area of said hollow mold solidifies;
(c) said several indicators being produced so as to have different melting points;
(d) utilizing said several indicators having said different melting points for monitoring different temperatures of said at least one product; and
(e) allocating to each said critical temperature to be monitored one said indicator having a melding point corresponding to said critical temperature.

8. The method as claimed in claim 7, wherein each number of said indicators having different melting points has associated with it a different indicia.

9. The method as claimed in claim 7, wherein the indicators are initially frozen into their fixed geometrical shape and are subsequently packaged in thermally conductive manner with the cooled or deep-frozen product which is to be monitored, the indicators being graded in groups according to their melting points.

* * * * *